US011948092B2

United States Patent
Wu et al.

(12) United States Patent
(10) Patent No.: US 11,948,092 B2
(45) Date of Patent: Apr. 2, 2024

(54) BRAIN-INSPIRED COGNITIVE LEARNING METHOD

(71) Applicant: Nanjing University of Aeronautics and Astronautics, Nanjing (CN)

(72) Inventors: Qihui Wu, Nanjing (CN); Tianchen Ruan, Nanjing (CN); Shijin Zhao, Nanjing (CN); Fuhui Zhou, Nanjing (CN); Yang Huang, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 17/786,564

(22) PCT Filed: Nov. 8, 2021

(86) PCT No.: PCT/CN2021/129297
§ 371 (c)(1),
(2) Date: Jun. 17, 2022

(87) PCT Pub. No.: WO2022/247151
PCT Pub. Date: Dec. 1, 2022

(65) Prior Publication Data
US 2023/0133628 A1    May 4, 2023

(30) Foreign Application Priority Data
May 25, 2021  (CN) .......................... 202110569553.9

(51) Int. Cl.
*G06N 3/0985*      (2023.01)
(52) U.S. Cl.
CPC .................. *G06N 3/0985* (2023.01)
(58) Field of Classification Search
CPC ........ G06N 3/0985; G06N 20/00; G06N 3/08; G06N 3/045
See application file for complete search history.

(56) References Cited

U.S. PATENT DOCUMENTS

| 2017/0091664 A1 | 3/2017 | Sanchez et al. |
| 2021/0081837 A1* | 3/2021 | Polleri .................... G06F 9/541 |
| 2023/0133628 A1* | 5/2023 | Wu ........................ G06N 20/00 |
| | | 706/25 |

FOREIGN PATENT DOCUMENTS

| CN | 105205533 B | 1/2018 |
| CN | 109447140 A | 3/2019 |

(Continued)

OTHER PUBLICATIONS

Wu et al., "A Unified Cognitive Learning Framework for Adapting to Dynamic Environment and Tasks", Jun. 1, 2021, pp. 1-16. (Year: 2021).*

(Continued)

*Primary Examiner* — Ying Yu Chen
(74) *Attorney, Agent, or Firm* — Bayramoglu Law Offices LLC (57) ABSTRACT

A brain-inspired cognitive learning method can obtain good learning results in various environments and tasks by selecting the most suitable algorithm models and parameters based on the environments and tasks, and can correct wrong behavior. The framework includes four main modules: a cognitive feature extraction module, a cognitive control module, a learning network module, and a memory module. The memory module includes a data base, a cognitive case base, and an algorithm and hyper-parameter base, which store data of dynamic environments and tasks, cognitive cases, and concrete algorithms and hyper-parameter values, respectively. For dynamic environments and tasks, the most suitable algorithm model and hyper-parameter combination can be flexibly selected. In addition, with "good money drives out bad", mislabeled data is corrected using correctly labeled data, to achieve robustness of training data.

9 Claims, 6 Drawing Sheets

(56) References Cited

FOREIGN PATENT DOCUMENTS

CN        111714118 A     9/2020
CN        113255765 A     8/2021

OTHER PUBLICATIONS

Pascal Kerschke, et al., Automated Algorithm Selection: Survey and Perspectives, Evolutionary Computation, 2019, pp. 3-45, vol. 27, No. 1.
Shai Shalev-Shwartz, Online Learning and Online Convex Optimization, Foundations and Trends in Machine Learning, 2011, pp. 107-194, vol. 4, No. 2.
Chelsea Finn, et al., Online Meta-Learning, Proc. of the 36th International Conference on Machine Learning (ICML-19), 2019, pp. 1920-1930.
Guanxiong Zeng, et al., Continual learning of context-dependent processing in neural networks, Nature Machine Intelligence, 2019, pp. 364-372, vol. 1.

\* cited by examiner

BRAIN-INSPIRED COGNITIVE LEARNING METHOD

CROSS REFERENCE TO THE RELATED APPLICATIONS

This application is the national phase entry of International Application No. PCT/CN2021/129297, filed on Nov. 8, 2021, which is based upon and claims priority to Chinese Patent Application No. 202110569553.9, filed on May 25, 2021, the entire contents of which are incorporated herein by reference.

TECHNICAL FIELD

The present disclosure relates to the field of artificial intelligence, and more specifically, to a brain-inspired cognitive learning framework and method in machine learning.

BACKGROUND

In recent years, machine learning has become a hot topic in academia and industry and has been widely used in many fields. Various machine learning frameworks have been proposed to enable a system to learn intelligently from previously acquired experience. Existing frameworks have some advantages, but traditional machine learning frameworks usually rely on a large amount of expert knowledge and a large number of high-quality labeled samples. Without such data, performance of the frameworks is compromised greatly. In addition, suitable algorithm models and parameter combinations are also crucial for performance of a learning algorithm. In traditional machine learning algorithms, once a training process is completed, models and hyper-parameters do not change, and machine learning algorithms can only implement fixed functions that have been trained, but cannot adapt to dynamic environments and tasks through self-learning. Such defects limit the performance and application range of the algorithms. Therefore, it is important to construct a learning framework that can adapt to dynamic environments and dynamic tasks.

P. Kerschke, H H Hoos, F. Neumann, H. Trautmann et al. proposed a unified meta-learning algorithm framework in their paper "Automated algorithm selection: Survey and perspectives" (Evolutionary computation, vol. 27, no. 1, pp. 3-45, 2019). Meta-learning is a learning framework inspired by educational psychology, and has been applied in the field of machine learning. Major components of this framework are meta features and meta knowledge bases. Meta-learning extracts problem features, runs different machine learning algorithms on a wide range of learning tasks, and collects their performance to construct a performance knowledge base. Through such experience (also known as "metadata") based learning, for a new environment and task, the most similar meta-case is found from the knowledge base, so as to quickly find a suitable algorithm model and hyper-parameters to solve a new problem. Because of this advantage, meta-learning has been widely used for algorithm selection and hyper-parameter optimization in fields such as classification and image recognition. However, for a problem that cannot be found in the meta knowledge base or has a low similarity to existing cases, meta-learning usually has a poor performance. In addition, a large number of prior task sets are required, and it is assumed that tasks are all independently and identically distributed. Once the tasks dynamically change and are no longer independently and identically distributed, the framework cannot adapt to such change in a timely manner. Moreover, this framework cannot optimize the learning model by exploiting performance information of actual tests, so it cannot handle complex data and complex learning environments.

S. Shalev-Shwartz proposed an online learning algorithm framework in his paper "Online learning and online convex optimization" (Foundations and trends in Machine Learning, vol. 4, no. 2, pp. 107-194, 2011). The online learning algorithm obtains training data continuously and sequentially. It can quickly adjust a model according to feedback data, which improves accuracy of the model. However, an online learning process focuses only on optimizing a current problem. For a new task, because previous task information is not used to obtain initial parameters of the model, the learning speed and accuracy are reduced.

C. Finn, A. Rajeswaran, S. Kakade and S. Levin et al. proposed an online meta-learning framework that combines meta-learning with online learning in their paper "Online Meta-Learning" (Proc. of the 36$^{th}$ International Conference on Machine Learning (ICML-19), pp. 1920-1930). This framework utilizes previous experience to acquire a priori knowledge and is able to adapt to a current task. However, similar to meta-learning, online meta-learning can only adapt to task changes that have been trained, and cannot adapt to brand new tasks and environments. In addition, learning performance of this framework degrades significantly when corrupted training samples exist in a meta knowledge base.

G. Zeng, Y. Chen, B. Cui and S. Yu et al. proposed a method for continual learning in neural networks in their paper "Continual learning of context-dependent processing in neural networks" (Nat. Mach. Intell., vol. 1, pp. 364-372, 2019), to gradually learn various laws in the real world. However, if the training data is not accurate enough, continual learning performance of this framework also drops significantly.

The patent application "Developmental Automaton with Brain Cognition Mechanism and Learning Method thereof" (application number: CN201510628233.0, application publication number: CN105205533B) filed by North China University of Science and Technology discloses a developmental automaton based on the brain cognition mechanism. This method provides a widely applicable mathematical model with powerful generalization for an autonomous development process of systems, and combines a sensorimotor system with an intrinsic motivation mechanism to improve self-learning and adaptive capabilities of the systems. However, this framework has no self-evaluation function to correct non-optimal behavior caused by false signals.

SUMMARY

In view of the foregoing defects in the prior art, the present disclosure proposes a brain-inspired cognitive learning method.

To achieve the above objective, the present disclosure adopts the following technical solution:

A brain-inspired cognitive learning method, including the following steps:
(1) online learning:
  (1a) accepting a dynamic environment and a dynamic task from the outside world;
  (1b) extracting, by a cognitive feature extraction module, features of the dynamic environment and the dynamic task, and transmitting the features to a cognitive control module;

(1c) establishing, by the cognitive control module, a mapping relationship between the features obtained in step (1b) and suitable algorithms and hyper-parameters, to obtain a suitable algorithm model and hyper-parameter combination;

(1d) calling, by the cognitive control module, the concrete algorithm model and hyper-parameter combination selected in step (1c) from an algorithm and hyper-parameter base in a memory module, and transmitting the concrete algorithm model and hyper-parameter combination to a learning network; and (1e) executing, by a learning network module, the algorithm model and hyper-parameter combination called in step (1d), executing a hyper-parameter and an algorithm in the dynamic environment and the dynamic task extracted in step (1b), obtaining a learning result, and outputting the learning result to the dynamic environment of the outside world;

(2) offline self-learning:

(2a) storing raw data of the dynamic environment and the dynamic task extracted in step (1b) of the online learning into a data base in the memory module, and storing the features of the dynamic environment and task, the algorithm model and hyper-parameter combination selected in step (1c), and the learning result obtained in step (1e) as a new cognitive case into a cognitive case base in the memory module;

(2b) sampling a cognitive case in the cognitive case base;

(2c) establishing, by the cognitive control module, a mapping relationship between features of the case obtained in step (2b) and suitable algorithms and hyper-parameters, to obtain a suitable algorithm model and hyper-parameter combination;

(2d) calling, by the cognitive control module, the concrete algorithm model and hyper-parameter combination selected in step (2c) from the algorithm and hyper-parameter base in the memory module, and transmitting the concrete algorithm model and hyper-parameter combination to the learning network;

(2e) executing, by the learning network based on the dynamic environment and task in step (2b), the algorithm model and hyper-parameter combination obtained in step (2d), obtaining a learning result, and transmitting the learning result to a cognitive evaluation module;

(2f) transmitting, by the cognitive case base, a previous best learning result of the case in step (2b) to the cognitive evaluation module;

(2g) comparing, by the cognitive evaluation module, the new learning result of the case in step (2e) with the previous best learning result of the case in step (2f), transmitting the better learning result and algorithm model and hyper-parameter combination achieving the better learning result to the cognitive case base as an updated previous best algorithm model, hyper-parameter combination, and performance, and updating the cognitive case in step (2b); and (2h) retraining the cognitive control module according to the updated cognitive case base.

In order to optimize the technical solution, a specific measure further includes:

In step (1a), the dynamic environment and the dynamic task received from the outside world are $[e,x]=d \in D$, where e represents data describing the dynamic environment, x represents data describing the dynamic task, d represents a vector of the dynamic environment and the dynamic task, D is an external data base, and $\in$ is signs of element, indicating that the dynamic environment and the dynamic task come from the external data base.

In step (1b), the cognitive feature extraction module extracts the features $f(e,x)$ of the dynamic environment and the dynamic task, and transmits the features $f(e,x)$ to the cognitive control module.

In step (1c), the cognitive control module establishes the mapping relationship $S[f(e,x)]$ between the features obtained in step (1b) and the suitable algorithms and hyper-parameters to obtain the suitable algorithm model $a \in A$ and hyper-parameter combination $\lambda \in \Lambda$, where A represents an algorithm base, a is an algorithm therein, $\Lambda$ represents a hyper-parameter base, $\lambda$ represents a hyper-parameter combination therein, and $\in$ is signs of element, indicating that the dynamic environment and the dynamic task come from an external data base.

In step (1e), the learning network module executes the algorithm model and hyper-parameter combination called in step (1d), executes the algorithm a with the hyper-parameter $\lambda$ in environment and task d, obtains the learning result $y=a[\lambda,d]$, and outputs the learning result $y=a[\lambda,d]$ to the dynamic environment of the outside world.

In step (2a), the cognitive case base stores the raw data $[e,x]$ of the dynamic environment and task extracted in step (1b) of the online learning into a data base $\tilde{D}$ in the memory module, and stores the features $f(e,x)$ of the dynamic environment and task, the algorithm model and hyper-parameter combination $(a, \lambda)$ selected in step (1c), and the learning result y obtained in step (1e) as the new cognitive case into the cognitive case $[f(e,x), (a_{best},\lambda_{best}),y_{best}]$ into the cognitive case base in the memory module.

In step (2c), the cognitive control module establishes the mapping relationship $S[f(\tilde{e},\tilde{x})]$ between the features of the case obtained in step (2b) and the suitable algorithms and hyper-parameters, to obtain the suitable algorithm model $\tilde{a}$ and hyper-parameter combination $\tilde{\lambda}$.

In step (2e), the learning network executes, based on the dynamic environment and task $\tilde{d}=[\tilde{e},\tilde{x}]$ in step (2b), the algorithm model and hyper-parameter combination obtained in step (2d), obtains the learning result $\tilde{y}=\tilde{a}[\tilde{\lambda},\tilde{d}]$ and transmits the learning result $\tilde{y}=\tilde{a}[\tilde{\lambda},\tilde{d}]$ to the cognitive evaluation module.

In step (2g), the cognitive evaluation module compares the new learning result $\tilde{y}$ of the case in step (2e) with a previous best learning result $\tilde{y}_{best}$ best of the case in step (2f), transmits the better learning result and algorithm model and hyper-parameter combination achieving the better learning result to the cognitive case base as the updated previous best algorithm model, hyper-parameter combination, and performance, and updates the cognitive case $[f(\tilde{e},\tilde{x}), (\tilde{a}_{best}, \tilde{\lambda}_{best}), \tilde{y}_{best}]$ in step (2b).

Improving intelligent machine learning methods by simulating human's cognitive mechanism and behavior according to the brain mechanism of humans and primates is an important innovation point in the field of artificial intelligence. Studies show that humans and primates can formulate and complete complex plans to guide behavior due to the cooperation of regions in the brain such as the sensory cortex, prefrontal cortex, premotor cortex, anterior cingulate cortex (ACC), and memory center; can flexibly and quickly change, when the environment and tasks change, their own behavior according to activities of the prefrontal cortex, to adapt to the dynamic changes; and can correct wrong behavior and make better decisions based on feedback information. These features and activities are all determined by the brain cognitive mechanism.

A machine learning framework for cognitive learning has been invented, inspired by the brain cognitive mechanism of humans and primates. This framework selects the most suitable algorithm model and parameters according to environments and tasks, can obtain good learning effect in various environments and tasks, and can correct wrong behavior. This framework includes four main modules: a cognitive feature extraction module, a cognitive control module, a learning network module, and a memory module. The memory module includes a data base, a cognitive case base, and an algorithm and hyper-parameter base, which store data of dynamic environments and tasks, cognitive cases, and concrete algorithms and hyper-parameter values, respectively. For dynamic environments and tasks, the most suitable algorithm model and hyper-parameter combination can be flexibly selected. In addition, with "good money drives out bad", mislabeled data is corrected using correctly labeled data, to achieve robustness of training data.

Compared with the prior art, the present disclosure has the following advantages:

1. Based on the brain mechanism, the present disclosure introduces the cognitive control module and the memory module, such that cognitive case learning results stored in the memory module can be called for the cognitive control module to update a matching relationship between the features of the environment and task and a selected algorithm and hyper-parameter. In this way, the learning ability can be continuously improved, and more suitable algorithms and parameters can be selected. This overcomes the deficiency of the existing frameworks that learning performance cannot be improved any more once the training is completed, and enables self-learning ability for the present disclosure.
2. The present disclosure introduces the cognitive feature extraction module based on the brain mechanism, such that environment or task changes can be perceived and new features of the dynamic environment and task can be extracted. The cognitive control module changes the selected algorithm model and hyper-parameter combination based on the new features, and a matching relationship between the features of the environment and task and algorithms and hyper-parameters. This overcomes the shortcoming that the existing frameworks cannot adapt to dynamically changing scenarios due to fixed algorithms and hyper-parameters, and perform poorly in new scenarios. The present disclosure can select the most suitable algorithms and hyper-parameters for different scenarios, achieving adaptability to dynamic environments and tasks.
3. The present disclosure introduces the cognitive evaluation module based on the brain mechanism, such that during offline self-learning, performance of the selected algorithm model and hyper-parameters in a scenario can be evaluated, a current learning result can be compared with results in cognitive cases, and mislabeled training samples can be corrected. This overcomes the shortcoming that the existing frameworks are extremely dependent on quality of training samples. The present disclosure can maintain robustness even with mislabeled training samples, reduce bad training samples, and improve learning performance. The present disclosure also supports "good money drives out bad".

DETAILED DESCRIPTION OF THE EMBODIMENTS

The following describes the embodiments of the present disclosure in detail with reference to the drawings.

The present disclosure will be further described below in conjunction with the accompanying drawings.

Figure 1:
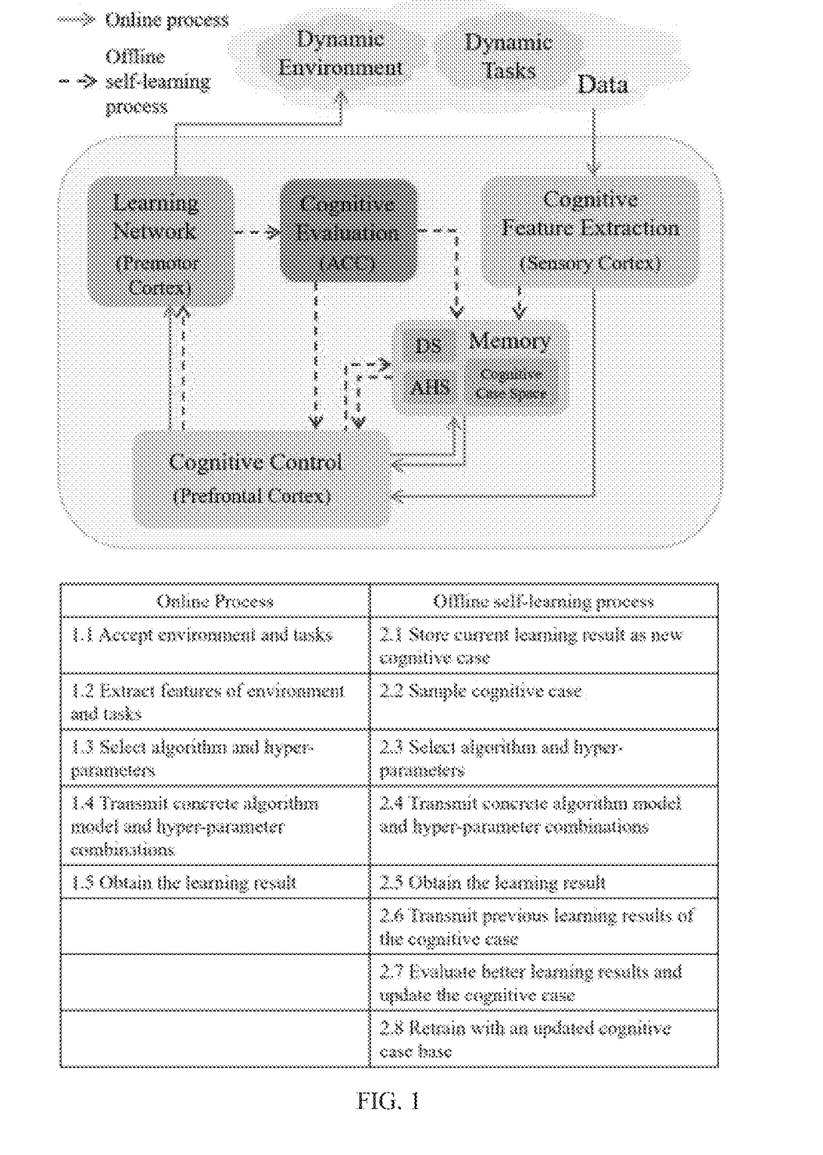
FIG. 1 is a flowchart of the present disclosure.

Specific steps of a method of the present disclosure are described below with reference to FIG. 1.

1. Online Learning:

An online learning process corresponds to an executive control process of the brain cognitive mechanism. Executive control is a complex cognitive process in which individuals dynamically and flexibly regulate activities of multiple cognitive subsystems in the process of goal-oriented behavior. It performs two operations on external tasks and data: making plans to guide behavior, and making quick adjustments when unexpected changes occur. This mechanism enables primates to rapidly switch behaviors in dynamic environments.

Step 1.1. Accept dynamic environments and dynamic tasks [e,x]=d∈D from the outside world, where e represents data describing the dynamic environment, x represents data describing the dynamic task, d represents a vector of the dynamic environment and the dynamic task, D is an external data base, and ∈ is signs of element, indicating that the dynamic environment and the dynamic task come from an external data base.

Step 1.2. A cognitive feature extraction module, corresponding to the sensory cortex in the cerebral cortex, extracts features f(e,x) of the data, and transmits the features f(e,x) to a cognitive control module.

Step 1.3. The cognitive control module, corresponding to the prefrontal cortex in the cerebral cortex and integrating features of the sensory cortex, performs cognitive control based on feature information and relevant experience knowledge, and obtains association information between stimuli and responses; and establishes a mapping relationship S[f(e,x)] between the features obtained in step 1.2 and suitable algorithms and hyper-parameters, to obtain a suitable algorithm model a∈A and hyper-parameter combination λ∈Λ, where A represents an algorithm base, a represents an algorithm therein, Λ represents a hyper-parameter base, λ represents a hyper-parameter combination therein, and ∈ is signs of element, indicating that the algorithm comes from the algorithm base and the hyper-parameter combination comes from the hyper-parameter base.

Step 1.4. The cognitive control module calls the concrete algorithm model and hyper-parameter combination selected in step 1.3 from the algorithm base A and hyper-parameter base Λ in a memory module that corresponds to the memory center in the brain, and transmits the concrete algorithm model and hyper-parameter combination to a learning network.

Step 1.5. The learning network module, corresponding to the premotor cortex, obtains a concrete motion plan based on the association information between stimuli and responses, executes the algorithm and hyper-parameters called in step 1.4, executes an algorithm a with a hyper-parameter λ in the environment and task d, obtains a learning result y=a[λ,d], and outputs the learning result to the dynamic environment of the outside world.

2. Offline Self-Learning:

Offline self-learning corresponds to an introspection process of the brain cognitive mechanism. The executive control process is a fast process that may result in inappropriate motor responses. By introspecting events that are stored in the internal memory and that result in inappropriate motor responses, the introspection process can execute more appropriate motor responses. The introspection process is a spontaneous mental activity independent of a current task or a perceived environment.

Step 2.1. The memory module, corresponding to the memory center in the brain, stores raw data [e,x] of the dynamic environment and task extracted in step 1.2 of the online learning into a data base $\tilde{D}$ in the memory module, and stores the features f(e,x) of the dynamic environment and task, the algorithm model and hyper-parameter combination (a,λ) selected in step 1.3, and the learning result y obtained in step 1.5 as a new cognitive case [f(e,x),(a_{best}, λ_{best}),y_{best}] into a cognitive case base in the memory module.

Step 2.2. Sample a cognitive case [f(ẽ,x̃),(ã_{best},λ̃_{best}),ỹ_{best}] in the cognitive case base.

Step 2.3. The cognitive control module, corresponding to the prefrontal cortex in the cerebral cortex and integrating features of the sensory cortex, performs cognitive control based on feature information and relevant experience knowledge, obtains association information between stimuli and responses, and establishes a mapping relationship S[f(ẽ,x̃)] between the features of the case in step 2.2 and suitable algorithms and hyper-parameters to obtain a suitable algorithm model ã and hyper-parameter combination λ̃.

Step 2.4. The cognitive control module calls the concrete algorithm model and hyper-parameter combination selected in step 2.3 from the algorithm and hyper-parameter base in the memory module, and transmits the concrete algorithm model and hyper-parameter combination to the learning network.

Step 2.5. The learning network module, corresponding to the premotor cortex, obtains a motor plan based on the association information between stimuli and response, executes, based on the dynamic environment and task d̃=[ẽ,x̃] in step 2.2, the algorithm model and hyper-parameter combination obtained in step 2.4, obtain a learning result ỹ=ã[λ̃,d̃], and transmit the learning result ỹ=ã[λ̃,d̃] to the cognitive evaluation module.

Step 2.6. The cognitive case base in the memory module transmits a previous best learning result ỹ_{best} of the case in step 2.2 to the cognitive evaluation module.

Step 2.7. The cognitive evaluation module, corresponding to the ACC in the cerebral cortex, monitors a conflict response in the premotor cortex, that is, compares the new learning result ỹ of the case in step 2.5 with the previous best learning result ỹ_{best} of the case in step 2.6; feeds back conflict information to the prefrontal cortex, that is, transmits the better learning result and algorithm model and hyper-parameter combination achieving the better learning result to the cognitive case base as an updated previous best algorithm model, hyper-parameter, and learning performance; and updates the cognitive case [f(ẽ,x̃),(ã_{best}, λ̃_{best}), ỹ_{best}] in step 2.2. If the previous best learning result y'* of the sampled case is better than the new learning result y', no update is performed; otherwise update is performed according to the following formula:

$$[f(\tilde{e},\tilde{x}),(\tilde{a}_{best},\tilde{\lambda}_{best}),\tilde{y}_{best}]=[f(\tilde{e},\tilde{x}),(\tilde{a},\tilde{\lambda}),\tilde{y}]$$

Step 2.8. Retrain the cognitive control module according to the updated cognitive case base.

The following further describes the effects of the present disclosure based on simulation tests.

1. Simulation Conditions:

The simulation tests of the present disclosure were performed using MATLAB R2016a. In the present disclosure, an image classification task is used as an example.

In this example, there are five different environments, or five datasets, including: common datasets MNIST, Fashion-MNIST, and Cifar-10; mini-ImageNet, a sub-dataset with five classes from ImageNet, each class having 4500 training samples; and mini-MNIST, a sub-dataset from MNIST, with each class having 1000 training samples. In this example, there are two tasks: image classification accuracy and required image classification time.

Cognitive features of the instance include five dataset features: the total number of training samples of images in the dataset, the number of image classes in the dataset, width of the images in the dataset (the images are adjusted to be equal in length and width), color features of the images in the dataset, and image classification difficulty; and two performance requirement features: required image classification accuracy and required image classification completion time.

In this example, the cognitive control module uses a structure of radial basis function neural network (RBFNN) for algorithm selection, and uses a structure of back-propagation (BP) neural network for hyper-parameter selection.

In this example, the algorithm base includes five different classification algorithms: support vector machine (SVM), Adaboosting, random forest, decision tree, and deep neural network (DNN). The hyper-parameter base contains important hyper-parameters for each of these algorithms.

2. Simulation Content:

FIG. 2(*a*) to FIG. 2(*d*) are comparison diagrams of algorithm selection accuracy, hyper-parameter selection accuracy, and image classification accuracy of the present disclosure and the prior art as the index of the test increases.

Figure 3A:
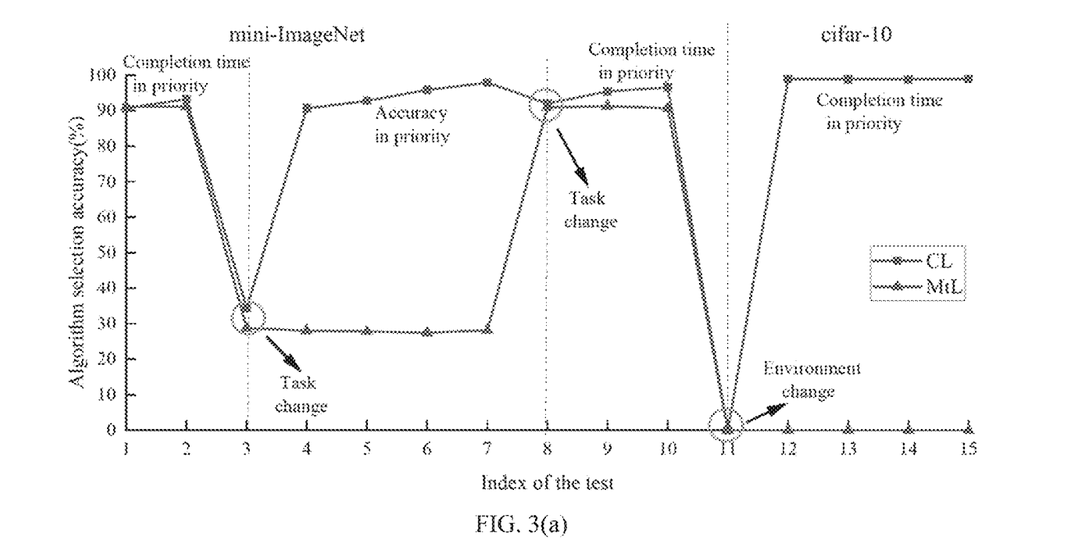
FIG. 3(a) and FIG. 3(b) are comparison diagrams of algorithm selection accuracy and hyper-parameter selection accuracy of the present disclosure and the prior art when environments and tasks dynamically change.
Figure 3B:
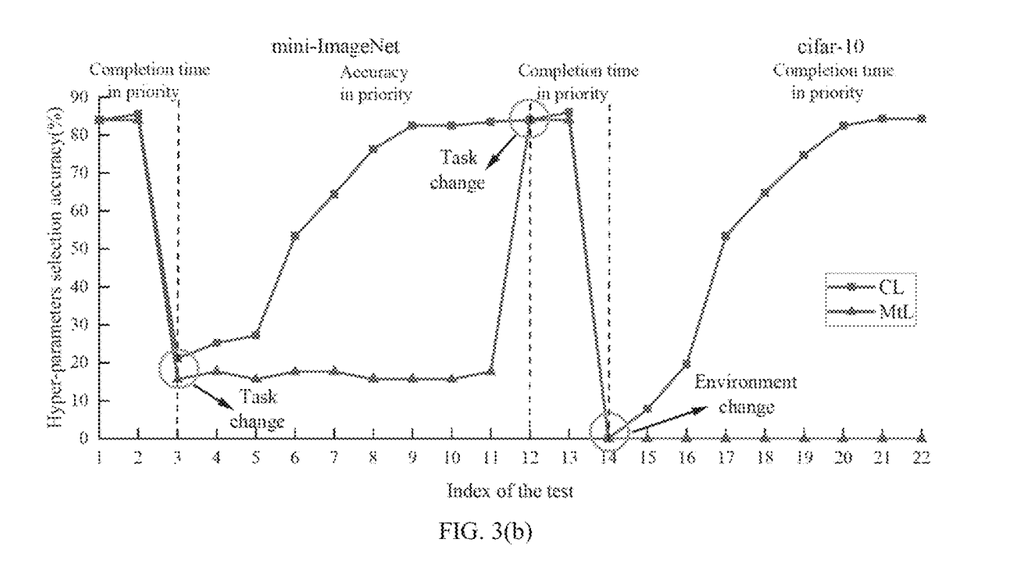

FIG. 3(*a*) and FIG. 3(*b*) are comparison diagrams of algorithm selection accuracy and hyper-parameter selection accuracy of the present disclosure and the prior art when environments and tasks dynamically change.

FIG. 4(*a*) to FIG. 4(*d*) are comparison diagrams of algorithm selection accuracy, hyper-parameter selection accuracy, and image classification accuracy of the present disclosure and the prior art under different quantities of mislabeled training samples.

FIG. 2(*a*) to FIG. 2(*d*) show curves of comparison results of algorithm selection accuracy, DNN hyper-parameter selection accuracy, and DNN image classification accuracy of the present disclosure and the prior art as the index of the test increases. It can be seen that in the prior art, a fixed meta-case base is obtained before the first test, and as the index of the test increases, its algorithm selection accuracy, hyper-parameter selection accuracy, and image classification accuracy fluctuate slightly, but almost remain stable. In this method, a size of the cognitive case base can be continuously expanded, and such performances can be gradually improved by absorbing test cases as training samples and retraining the neural network. With reference to FIG. 2(a), FIG. 2(b), FIG. 2(c), and FIG. 2(d), it can also be seen that with the improvement of the algorithm selection accuracy and hyper-parameter selection accuracy, the image classification accuracy is also improved.

Figure 2A:
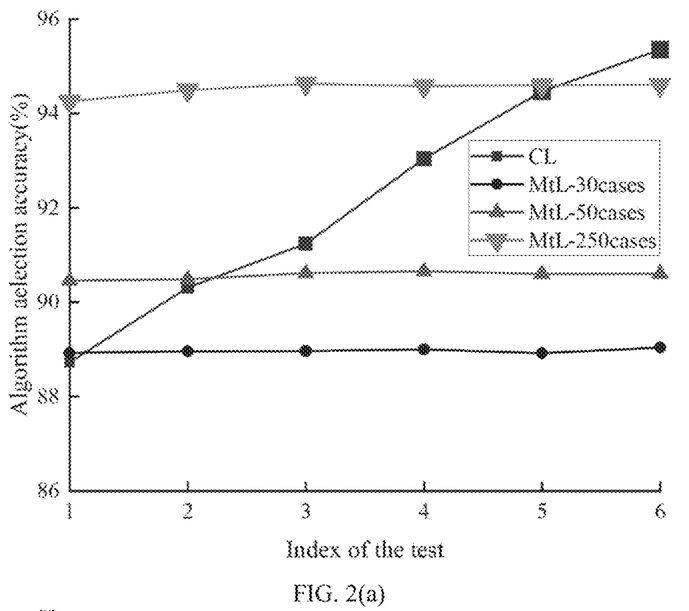
FIG. 2(a) to FIG. 2(d) are comparison diagrams of algorithm selection accuracy, hyper-parameter selection accuracy, and image classification accuracy of the present disclosure and the prior art as the index of the test increases.
Figure 2B:
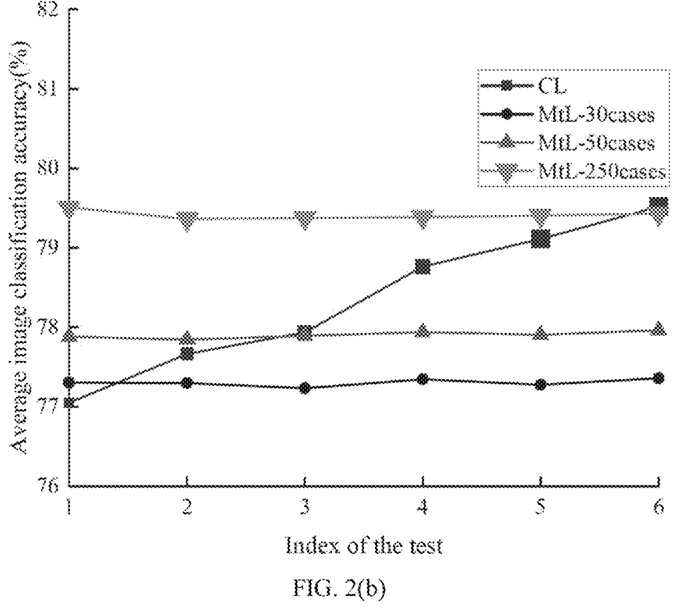

FIG. 2(a) and FIG. 2(b) are comparison diagrams of algorithm selection accuracy and algorithm-based image classification accuracy of the present disclosure and the prior art as the index of the test increases. Algorithm selection accuracy evaluation is to check whether a selected algorithm is the labeled best algorithm. Image classification accuracy evaluation is to check whether a classification result of image classification performed based on the selected algorithm and its best hyper-parameters is correct. A horizontal coordinate represents the index of the test (times), and a vertical ordinate represents an algorithm selection/image classification accuracy (%). A broken line marked with red squares represents the algorithm selection/image classification accuracy in the method of the present disclosure. According to the present disclosure, the tested cases can be stored into the cognitive case base. Therefore, from the 1st to 6th tests, the actual number of training samples for each dataset is 30, 50, 100, 150, 250, and 400, respectively. A broken line marked with black circles represents the algorithm selection/image classification accuracy for algorithm selection from a base with 30 meta-cases in each dataset in the prior art, a broken line marked with blue triangles represents the algorithm selection/image classification accuracy for algorithm selection from a base with 50 meta-cases in each dataset in the prior art, and a broken line marked with green inverted triangles represents the algorithm selection/image classification accuracy for algorithm selection from a base with 250 meta-cases in each dataset in the prior art. Changes of the algorithm selection/image classification accuracy obtained by the two methods show that when the number of training samples of the present disclosure is equal to the number of meta-cases of the prior-art method, performances of the two methods are almost the same. However, the algorithm selection/image classification accuracy obtained by the method of the present disclosure increases as the index of the test increases, while the algorithm selection/image classification accuracy obtained by the prior-art method is almost unchanged.

Figure 2C:
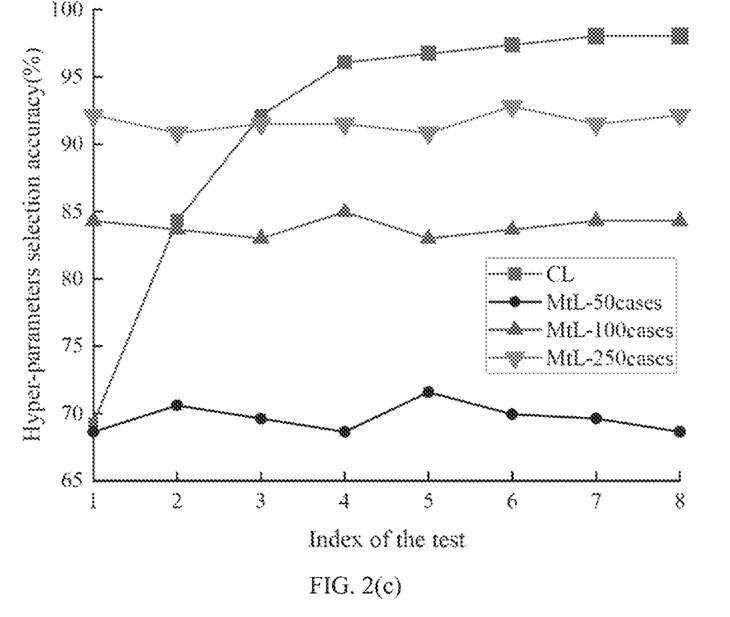
Figure 2D:
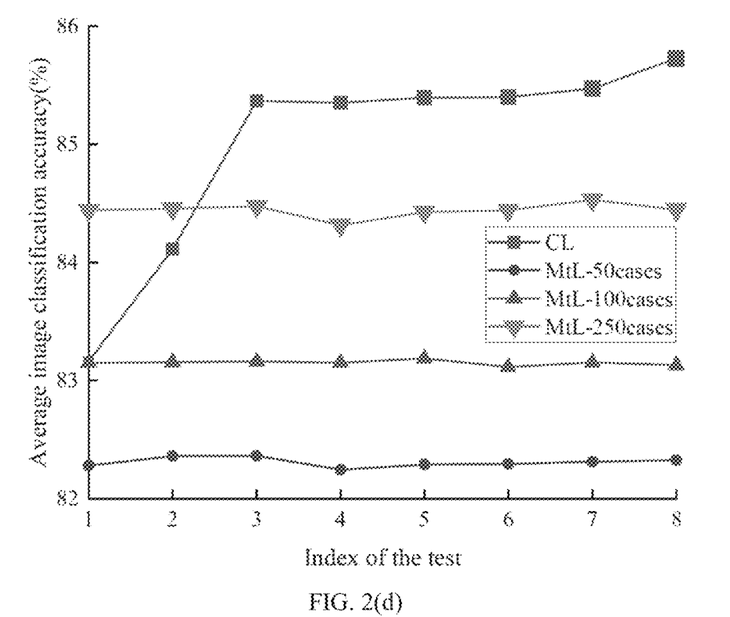

FIG. 2(c) and FIG. 2(d) are comparison diagrams of DNN hyper-parameter selection accuracy and hyper-parameter-based DNN image classification accuracy of the present disclosure and the prior art as the index of the test increases. DNN hyper-parameter selection accuracy evaluation is to check whether a selected hyper-parameter is the labeled best hyper-parameter. A horizontal coordinate represents the index of the test (times), and a vertical ordinate represents a hyper-parameter selection/image classification accuracy (%). A broken line marked with red squares represents the hyper-parameter selection/image classification accuracy in the method of the present disclosure. According to the present disclosure, the tested cases can be stored into the cognitive case base. Therefore, from the 1st to 6th tests, the number of training samples for each dataset is 50, 100, 150, 200, 250, and 300, respectively. A broken line marked with black circles represents the hyper-parameter selection/image classification accuracy for hyper-parameter selection from a base with 50 meta-cases in each dataset in the prior art, a broken line marked with blue triangles represents the hyper-parameter selection/image classification accuracy for hyper-parameter selection from a base with 100 meta-cases in each dataset in the prior art, and a broken line marked with green inverted triangles represents the hyper-parameter selection/image classification accuracy for hyper-parameter selection from a base with 250 meta-cases in each dataset in the prior art. Changes of the hyper-parameter selection/image classification accuracy obtained by the two methods show that when the number of training samples of the present disclosure is equal to the number of meta-cases of the prior-art method, performances of the two methods are almost the same. However, the hyper-parameter selection/image classification accuracy obtained by the method of the present disclosure increases as the index of the test increases, while the hyper-parameter selection/image classification accuracy obtained by the prior-art method is almost unchanged.

FIG. 3(a) and FIG. 3(b) are comparison curves of algorithm selection accuracy and hyper-parameter selection accuracy of the present disclosure and the prior art when environments and tasks dynamically change. It can be seen that the present disclosure can quickly adapt to the changing environments and tasks, and achieve a high accuracy after only a few tests. The dynamic environment refers to the change of datasets, and the dynamic task refers to the change of performance requirements. Completion time in priority means that a labeled algorithm is an algorithm that meets an accuracy requirement within the shortest completion time. Accuracy in priority means that a labeled algorithm is an algorithm that achieves the highest image classification accuracy within a relatively loose completion time. The maximum completion time is limited to 6000 seconds. A case with a completion time of less than 3000 seconds is defined as completion time in priority, and a case with a completion time of more than 3000 seconds is defined as accuracy in priority. In simulation, changes in the environment lead to changes in features of the image dataset, and changes in tasks lead to changes in requirements on the image classification accuracy and completion time. The prior-art method can achieve good performance only with the trained samples, and once the environment and task change, the performance remains low due to the fixed meta-case base.

FIG. 3(a) is a comparison diagram of algorithm selection accuracy of the present disclosure and the prior art when environments and tasks dynamically change. A horizontal coordinate represents the index of the test (times), and a vertical ordinate represents an algorithm selection accuracy (%). A broken line marked with red squares represents the algorithm selection accuracy in the method of the present disclosure. A broken line marked with blue triangles represents the algorithm selection accuracy for algorithm selection from a base with 50 meta-cases with completion time in priority in each mini-ImageNet in the prior art. Changes of the algorithm selection accuracy obtained by the two methods show that during the 1st and 2nd tests in which the dataset is mini-ImageNet and the task is completion time in priority, the selection accuracy of the two methods is almost the same. During the 3rd to 7th tests in which the task changes to accuracy in priority, the algorithm selection accuracy of the two methods drops low at the beginning, but as the index of the test increases, the algorithm selection accuracy obtained by the method of the present disclosure increases rapidly, while that obtained by the method in the prior art remains low. During the 8th to 10th tests in which the task changes again to completion time in priority, performance obtained by the method of the present disclosure is gradually better than that obtained by the method in the prior art. During the 11th to 15th tests in which the dataset changes to cifar-10 and the task is completion time in priority, the algorithm selection accuracy of the two methods drops low at the beginning, but as the index of the test increases, the algorithm selection accuracy obtained by the method of the present disclosure increases rapidly, while that obtained by the method in the prior art remains low.

FIG. 3(b) is a comparison diagram of hyper-parameter selection accuracy of the present disclosure and the prior art when environments and tasks dynamically change. A horizontal coordinate represents the index of the test (times), and a vertical ordinate represents a hyper-parameter selection accuracy (%). A broken line marked with red squares represents the hyper-parameter selection accuracy in the method of the present disclosure. A broken line marked with blue triangles represents the hyper-parameter selection accuracy for hyper-parameter selection from a base with 50 meta-cases with completion time in priority in each mini-ImageNet in the prior art. Changes of the hyper-parameter selection accuracy obtained by the two methods show that during the 1st and 2nd tests in which the dataset is mini-ImageNet and the task is completion time in priority, the selection accuracy of the two methods is almost the same. During the 3rd to 11th tests in which the task changes to accuracy in priority, the hyper-parameter selection accuracy of the two methods drops low at the beginning, but as the index of the test increases, the hyper-parameter selection accuracy obtained by the method of the present disclosure increases rapidly, while that obtained by the method in the prior art remains low. During the 12th and 13th tests in which the task changes again to completion time in priority, performance obtained by the method of the present disclosure is gradually better than that obtained by the method in the prior art. During the 14th to 22nd tests in which the dataset changes to cifar-10 and the task is completion time in priority, the hyper-parameter selection accuracy of the two methods drops low at the beginning, but as the index of the test increases, the hyper-parameter selection accuracy obtained by the method of the present disclosure increases rapidly, while that obtained by the method in the prior art remains low.

FIG. 4(a) to FIG. 4(d) are comparison curves of algorithm selection accuracy, hyper-parameter selection accuracy, and image classification accuracy of the present disclosure and the prior art under different quantities of mislabeled training samples. It can be seen that regardless of the proportion of mislabeled samples, by evaluating the cases and correcting the wrong cases, the algorithm selection accuracy, hyper-parameter selection accuracy, and image classification accuracy obtained by the present disclosure gradually increase through case evaluation and case correction. In the prior art, a fixed meta-case base is obtained before the first test, and mislabeled samples are maintained in the meta-case base, which persistently affects performance. Bad money refers to mislabeled cases in the cognitive case base. A bad money rate is expressed by the proportion of mislabeled cases. The training samples for algorithm or hyper-parameter selection may be mislabeled, and a wrong selection may be performed for the test samples. With reference to FIG. 4(a), FIG. 4(b), FIG. 4(c), and FIG. 4(d), it can be seen that with the improvement of the algorithm selection accuracy and hyper-parameter selection accuracy, the image classification accuracy is also improved.

Figure 4A:
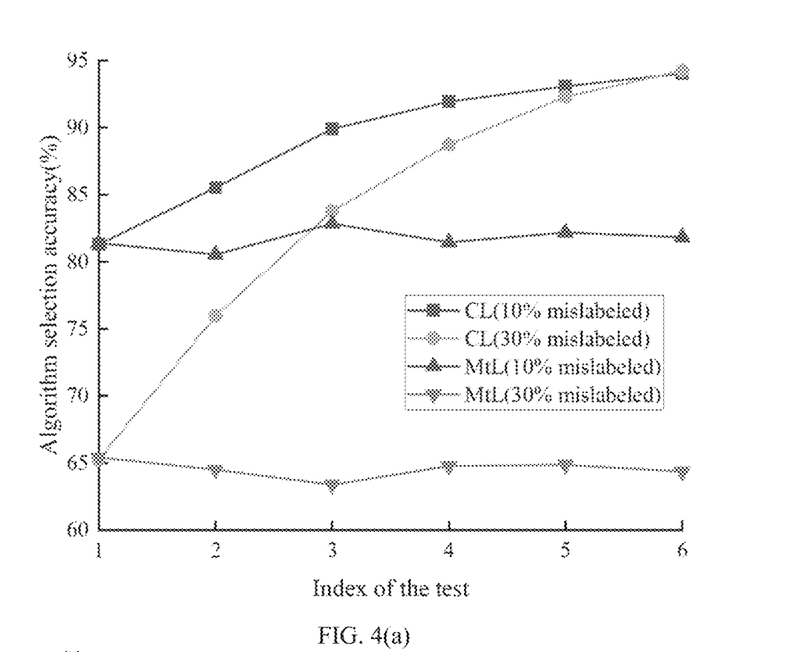
FIG. 4(a) to FIG. 4(d) are comparison diagrams of algorithm selection accuracy, hyper-parameter selection accuracy, and image classification accuracy of the present disclosure and the prior art under different quantities of mislabeled training samples.
Figure 4B:
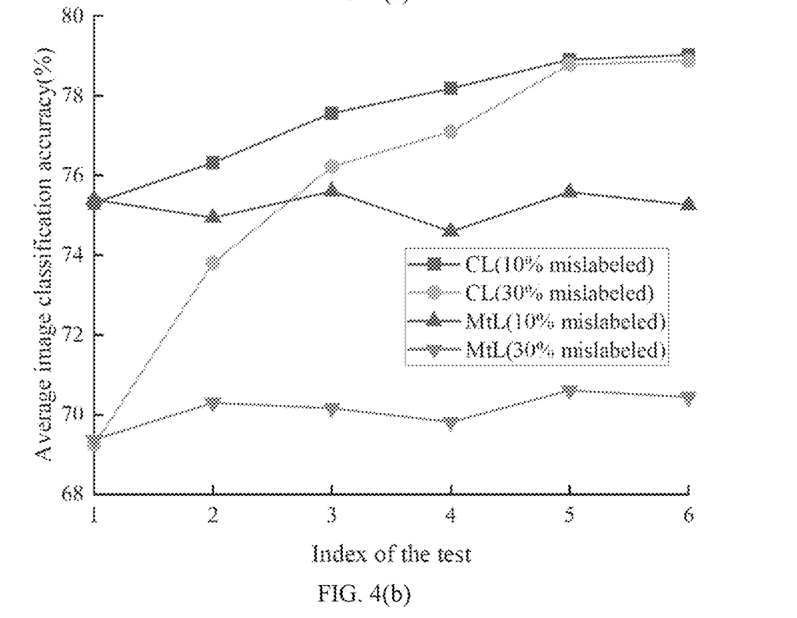

FIG. 4(a) and FIG. 4(b) are comparison diagrams of algorithm selection accuracy/algorithm-based image classification accuracy of the present disclosure and the prior art as the index of the test increases. A horizontal coordinate represents the index of the test (times), and a vertical ordinate represents an algorithm selection/image classification accuracy (%). A broken line marked with red squares represents the algorithm selection/image classification accuracy obtained by the method of the present disclosure when the bad currency rate is 10%, and a broken line marked with orange circles represents the algorithm selection/image classification accuracy obtained by the method of the present disclosure when the bad currency rate is 30%. A broken line marked with blue triangles represents the algorithm selection/image classification accuracy obtained by the method in the prior art when the bad currency rate is 10%, and a broken line marked with green inverted triangles represents the algorithm selection/image classification accuracy obtained by the method in the prior art when the bad currency rate is 30%. Changes of the algorithm selection/image classification accuracy obtained by the two methods show that the algorithm selection/image classification accuracy obtained by the method of the present disclosure is better than that obtained by the method in the prior art. Both methods are initially affected by bad money, but the performance obtained by the method the present disclosure is gradually improved. This is because a better matching relationship between the features of the environments and tasks and algorithms and hyper-parameters are stored in the cognitive case base, and the proportion of mislabeled samples decreases. This also because in the present disclosure, the cognitive evaluation module can compare a current learning result with previous learning results, and feed back an evaluation result to the cognitive control module. By contrast, the algorithm selection/image classification selection accuracy obtained by the method in the prior art is persistently affected by mislabeled samples and remains almost unchanged.

Figure 4C:
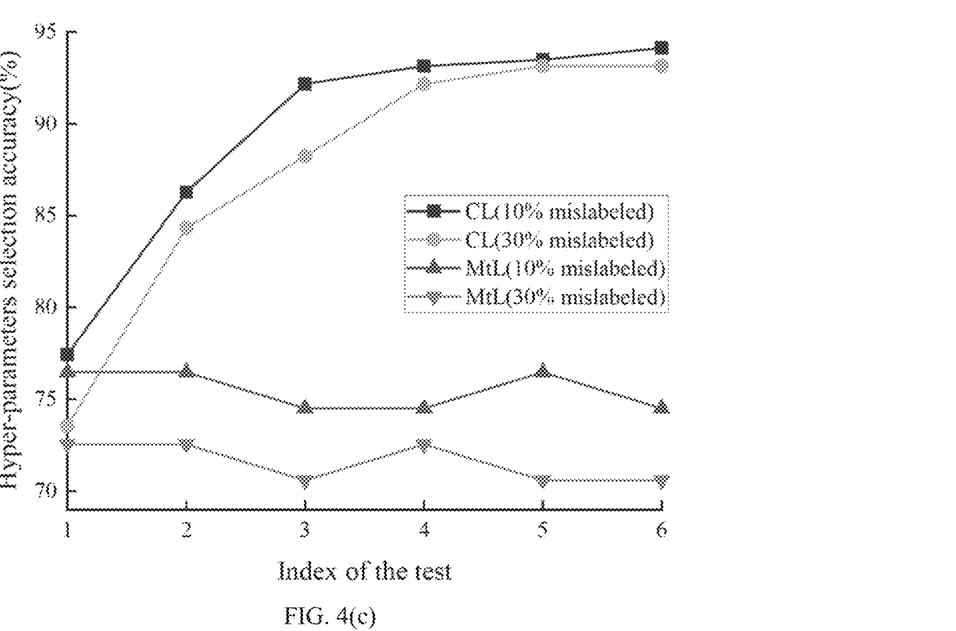
Figure 4D:
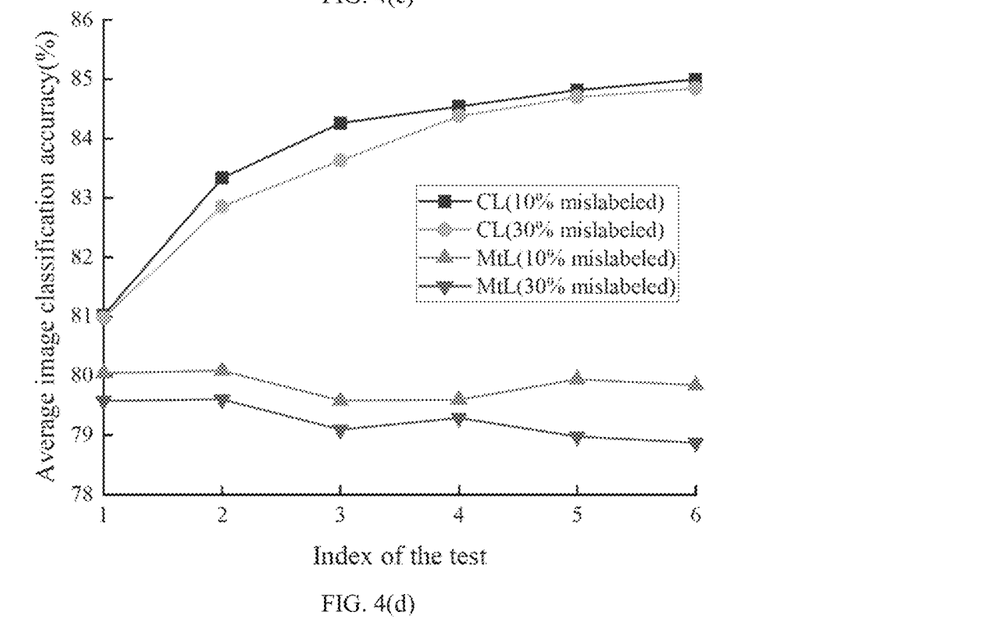

FIG. 4(c) and FIG. 4(d) are comparison diagrams of hyper-parameter selection accuracy/hyper-parameter-based DNN image classification accuracy of the present disclosure and the prior art as the index of the test increases. A horizontal coordinate represents the index of the test (times), and a vertical ordinate represents a hyper-parameter selection/image classification accuracy (%). A broken line marked with red squares represents the hyper-parameter selection/image classification accuracy obtained by the method of the present disclosure when the bad currency rate is 10%, and a broken line marked with orange circles represents the hyper-parameter selection/image classification accuracy obtained by the method of the present disclosure when the bad currency rate is 30%. A broken line marked with blue triangles represents the hyper-parameter selection/image classification accuracy obtained by the method in the prior art when the bad currency rate is 10%, and a broken line marked with green inverted triangles represents the hyper-parameter selection/image classification accuracy obtained by the method in the prior art when the bad currency rate is 30%. Changes of the accuracy obtained by the two methods show that the hyper-parameter selection/image classification accuracy obtained by the method of the present disclosure is better than that obtained by the method in the prior art. Both methods are initially affected by bad money, but the performance obtained by the method the present disclosure is gradually improved. This is because a better matching relationship between the features of the environments and tasks and algorithms and hyper-parameters are stored in the cognitive case base, and the proportion of mislabeled samples decreases. This also because in the present disclosure, the cognitive evaluation module can compare a current learning result with previous learning results, and feed back an evaluation result to the cognitive control module. By contrast, the hyper-parameter selection/image classification selection accuracy obtained by the method in the prior art is persistently affected by mislabeled samples and remains almost unchanged.

According to the foregoing simulation results and analysis, the brain-inspired cognitive learning framework and method proposed by the present disclosure support self-learning, adaptability to dynamically changing environments and tasks, and good money drives out bad, allowing the present disclosure to be better applied.

What is described above is merely the preferred implementation of the present disclosure, the scope of protection of the present disclosure is not limited to the above examples, and all technical solutions following the idea of the present disclosure fall within the scope of protection of the present disclosure. It should be noted that several modifications and adaptations made by those of ordinary skill in the art without departing from the principle of the present disclosure should fall within the scope of protection of the present disclosure.

What is claimed is:

1. A brain-inspired cognitive learning method based on a machine learning framework, comprising the following steps:
   (1) online learning by the machine learning framework, comprising:
   (1a) accepting a dynamic environment and a dynamic task from an outside world:
   (1b) extracting, by a cognitive feature extraction module, features of the dynamic environment and the dynamic task, and transmitting the features to a radial basis function neural network coupled with a structure of back-propagation neural network (RBFNN-BPNN):
   (1c) establishing, by RBFNN-BPNN a mapping relationship between the features obtained in step (1b) and algorithms and hyper-parameters in a memory module to obtain an online algorithm model and hyper-parameter combination;
   (1d) calling, by the RBFNN-BPNN, the online algorithm model and hyper-parameter combination selected in step (1c) from an algorithm and hyper-parameter base in the memory module, and transmitting the online algorithm model and hyper-parameter combination to a learning network; and
   (1e) executing, by a learning network module, the online algorithm model and hyper-parameter combination called in step (1d), executing a hyper-parameter and an algorithm in the dynamic environment and the dynamic task extracted in step (1b), obtaining an online learning result, and outputting the online learning result to the dynamic environment of the outside world;
   (2) offline self-learning by the machine learnim1 framework comprising:
   (2a) storing raw data of the dynamic environment and the dynamic task extracted in step (1b) of the online learning into a data base in the memory module, and storing the features of the dynamic environment and the dynamic task, the online algorithm model and hyper-parameter combination selected in step (1c), and the online learning result obtained in step (1e) as a new cognitive case into a cognitive case base in the memory module;
   (2b) sampling a cognitive case in the cognitive case base;
   (2c) establishing, by the RBFNN-BPNN, a mapping relationship between features of the cognitive case obtained in step (2b) and algorithms and hyper-parameters in the memory module, to obtain an offline algorithm model and hyper-parameter combination;
   (2d) calling, by the RBFNN-BPNN, the offline algorithm model and hyper-parameter combination selected in step (2c) from the algorithm and hyper-parameter base in the memory module, and transmitting the offline algorithm model and hyper-parameter combination to the learning network;
   (2e) executing, by the learning network based on the dynamic environment and the dynamic task in step (2b), the offline algorithm model and hyper-parameter combination obtained in step (2d), obtaining an offline learning result, and transmitting the offline learning result to a cognitive evaluation module;
   (2f) transmitting, by the cognitive case base, a previous learning result of the cognitive case in step (2b) to the cognitive evaluation module;
   (2g) comparing, by the cognitive evaluation module, the offline learning result of the cognitive case in step (2e) with the previous learning result of the cognitive case in step (2t"), transmitting a better learning result and the offline algorithm model and hyper-parameter combination that achieve the better learning result to the cognitive case base as an updated algorithm model, hyper-parameter combination, and performance, and updating the cognitive case in step (2b); and
   (2h) retraining the RBFNN-BPNN according to an updated cognitive case base.

2. The brain-inspired cognitive learning method according to claim 1, wherein in step (1a), the dynamic environment and the dynamic task received from the outside world are $[e,x]=d \in D$, wherein e represents data describing the dynamic environment, x represents data describing the dynamic task, d represents a vector of the dynamic environment and the dynamic task, D is an external data base, and $\in$ is signs of element, indicating that the dynamic environment and the dynamic task come from the external data base.

3. The brain-inspired cognitive learning method according to claim 1, wherein in step (1b), the cognitive feature extraction module extracts the features f(e,x) of the dynamic environment and the dynamic task, and transmits the features f(e,x) to the RBFNN/BPNN, wherein e represents data describing the dynamic environment, and x represents data describing the dynamic task.

4. The brain-inspired cognitive learning method according to claim 1, wherein in step (1c), the RBFNN-BPNN establishes the mapping relationship S[f(e,x)] between the features obtained in step (1b) and the algorithms and hyper-parameters in the memory module to obtain the online algorithm model $a \in A$ and hyper-parameter combination $\lambda \in \Lambda$, wherein e represents data describing the dynamic environment x represents data describing the dynamic task, f represents the features, A represents an algorithm base, a represents an algorithm therein, $\Lambda$ represents a hyper-parameter base, $\lambda$ represents a hyper-parameter combination therein, and $\in$ is signs of element, indicating that the dynamic environment and the dynamic task come from an external data base.

5. The brain-inspired cognitive learning method according to claim 1, wherein in step (1e), the learning network module executes the online algorithm model and hyper-parameter combination called in step (1d), executes the algorithm a with the hyper-parameter $\lambda$ in environment and task d, obtains the online learning result $y=a[\lambda,d]$, and outputs the online learning result $y=a[\lambda,d]$ to the dynamic environment of the outside world.

6. The brain-inspired cognitive learning method according to claim 1, wherein in step (2a), the cognitive case base stores the raw data [e, x] of the dynamic environment and the dynamic task extracted in step (1b) of the online learning into the data base $\tilde{D}$ in the memory module, and stores the features f(e,x) of the dynamic environment and the dynamic task, the online algorithm model and hyper-parameter combination (a, λ), wherein a represents an algorithm therein, λ represents a hyper-parameter combination therein, selected in step (1c), and the online learning result y obtained in step (1e) as the new cognitive case [f(e,x), ($a_{best}$,$\lambda_{best}$),$y_{best}$] into the cognitive case base in the memory module, wherein $a_{best}$ represents an updated algorithm therein, $\lambda_{best}$ represents an updated hyper-parameter combination therein, and $y_{best}$ represents an updated learning result.

7. The brain-inspired cognitive learning method according to claim 1, wherein in step (2c), the RBFNN-BPNN establishes the mapping relationship S[f(ẽ,x̃)] between the features of the cognitive case obtained in step (2b) and the algorithms and hyper-parameters in the memory module to obtain the offline algorithm model a and hyper-parameter combination $\tilde{\lambda}$, wherein ẽ represents offline data describing the dynamic environment, x̃ represents offline data describing the dynamic task, f represents the features.

8. The brain-inspired cognitive learning method according to claim 1, wherein in step (2e), the learning network executes, based on the dynamic environment and the dynamic task $\tilde{d}$=[ẽ,x̃] in step (2b), the offline algorithm model and hyper-parameter combination obtained in step (2d), obtains the offline learning result ỹ=ã[$\tilde{\lambda}$,$\tilde{d}$], and transmits the offline learning result ỹ=ã[$\tilde{\lambda}$,$\tilde{d}$] to the cognitive evaluation module, wherein ẽ represents offline data describing the dynamic environment, x̃ represents offline data describing the dynamic task, ã represents an offline algorithm therein and, $\tilde{\lambda}$ represents offline hyper-parameter combination therein.

9. The brain-inspired cognitive learning method according to claim 1, wherein in step (2g), the cognitive evaluation module compares the offline learning result ỹ of the cognitive case in step (2e) with the previous learning result $\tilde{y}_{best}$ of the cognitive case in step (2f), transmits the better learning result and the offline algorithm model and hyper-parameter combination that achieve the better learning result to the cognitive case base as the updated, labeled 'best' algorithm model, hyper-parameter combination, and performance, and updates the cognitive case [f(ẽ,x̃), ($\tilde{a}_{best}$, $\tilde{\lambda}_{best}$), $\tilde{y}_{best}$] in step (2b), wherein ẽ represents offline data describing the dynamic environment, x̃ represents offline data describing the dynamic task, f represents the features, $\tilde{a}_{best}$ represents an offline labeled 'best' algorithm therein, $\tilde{\lambda}_{best}$ represents an offline labeled 'best' hyper-parameter combination therein.

* * * * *